United States Patent
Ooshiro

(10) Patent No.: US 11,569,043 B2
(45) Date of Patent: Jan. 31, 2023

(54) METHOD OF MANUFACTURING AN ALUMINUM ELECTROLYTIC CAPACITOR WITH ELECTROSPUN FIBER FILM

(71) Applicant: KABUSHIKI KAISHA TOSHIBA, Minato-ku (JP)

(72) Inventor: Kenichi Ooshiro, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 6 days.

(21) Appl. No.: 16/875,178

(22) Filed: May 15, 2020

(65) Prior Publication Data

US 2021/0043392 A1 Feb. 11, 2021

(30) Foreign Application Priority Data

Aug. 8, 2019 (JP) .............................. JP2019-146404

(51) Int. Cl.
- *H01G 9/00* (2006.01)
- *H01G 9/045* (2006.01)
- *H01G 9/042* (2006.01)

(52) U.S. Cl.
CPC ......... *H01G 9/0029* (2013.01); *H01G 9/0032* (2013.01); *H01G 9/045* (2013.01); *H01G 9/0425* (2013.01)

(58) Field of Classification Search
CPC ...... H01G 9/045; H01G 9/048; H01G 9/0029; H01G 9/0032; H01G 9/02
See application file for complete search history.

(56) References Cited

U.S. PATENT DOCUMENTS

| | | | |
|---|---|---|---|
| 2009/0059475 A1* | 3/2009 | Arora | H01G 9/02 361/509 |
| 2010/0151333 A1* | 6/2010 | Nakamori | D04H 1/4342 428/401 |
| 2010/0202102 A1 | 8/2010 | Aoyama et al. | |
| 2012/0154985 A1* | 6/2012 | Kato | H01G 9/02 361/523 |
| 2012/0225358 A1* | 9/2012 | Seo | H01M 50/494 429/246 |

(Continued)

FOREIGN PATENT DOCUMENTS

| | | |
|---|---|---|
| CN | 101335363 A | 12/2008 |
| CN | 181796687 A | 8/2010 |

(Continued)

*Primary Examiner* — Scott B Geyer

(74) *Attorney, Agent, or Firm* — Oblon, McClelland, Maier & Neustadt, L.L.P.

(57) ABSTRACT

According to one embodiment, an aluminum electrolytic capacitor includes an anode, a cathode, and a fiber film. The anode includes a first metal layer and a dielectric layer. The first metal layer includes aluminum. The dielectric layer is formed on the first metal layer. The cathode includes a second metal layer. The second metal layer includes aluminum. The fiber film is provided between the anode and the cathode. The fiber film includes a first layer and a second layer. The first layer includes a first fiber having a first diameter. The first layer is provided between the dielectric layer and the second layer. The second layer includes a second fiber having a second diameter smaller than the first diameter.

6 Claims, 7 Drawing Sheets

(56) References Cited

U.S. PATENT DOCUMENTS

| | | | |
|---|---|---|---|
| 2015/0270522 A1* | 9/2015 | Yamada | H01M 50/449 |
| | | | 429/145 |
| 2016/0020027 A1 | 1/2016 | Lazarev | |
| 2016/0268065 A1 | 9/2016 | Gardner et al. | |
| 2018/0323015 A1* | 11/2018 | Andoralov | H01G 11/26 |
| 2019/0036094 A1* | 1/2019 | Yamato | H01M 4/66 |
| 2019/0198837 A1* | 6/2019 | Yushin | H01M 50/411 |
| 2019/0273233 A1* | 9/2019 | Morin | H01M 50/491 |
| 2021/0050600 A1* | 2/2021 | Uhm | H01M 12/06 |

FOREIGN PATENT DOCUMENTS

| | | | | |
|---|---|---|---|---|
| CN | 102473526 A | | 5/2012 | |
| DE | 102016125733 A1 * | | 6/2018 | H01G 13/04 |
| JP | 61-281454 A | | 12/1986 | |
| JP | 4178342 B2 | | 11/2008 | |
| KR | 10-2008-0035383 A | | 4/2008 | |
| KR | 10-2012-0031304 A | | 4/2012 | |

\* cited by examiner

METHOD OF MANUFACTURING AN ALUMINUM ELECTROLYTIC CAPACITOR WITH ELECTROSPUN FIBER FILM

CROSS-REFERENCE TO RELATED APPLICATIONS

This application is based upon and claims the benefit of priority from Japanese Patent Application No. 2019-146404, filed on Aug. 8, 2019; the entire contents of which are incorporated herein by reference.

FIELD

Embodiments described herein relate generally to an aluminum electrolytic capacitor, an electric instrument, and a method for manufacturing the aluminum electrolytic capacitor.

BACKGROUND

There is known an aluminum electrolytic capacitor in which a separator is provided between an aluminum anode and an aluminum cathode (Japanese Patent No. 4178342). In such an aluminum electrolytic capacitor, it is required to increase the capacitance while suppressing a short circuit.

DETAILED DESCRIPTION

Figure 1:
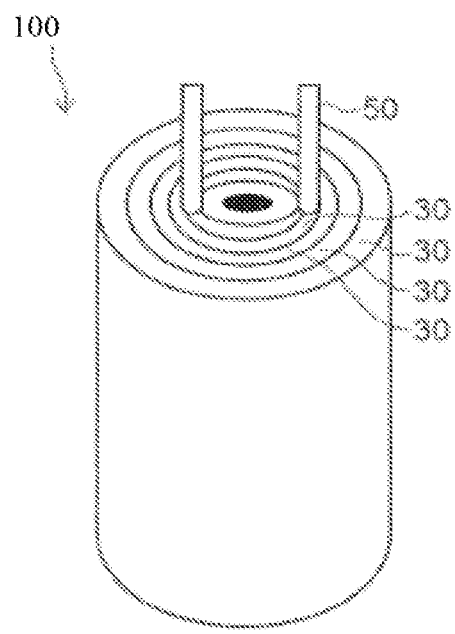
FIG. 1 is a perspective view illustrating an aluminum electrolytic capacitor according to an embodiment.

According to one embodiment, an aluminum electrolytic capacitor includes an anode, a cathode, and a fiber film. The anode includes a first metal layer and a dielectric layer. The first metal layer includes aluminum. The dielectric layer is formed on the first metal layer. The cathode includes a second metal layer. The second metal layer includes aluminum. The fiber film is provided between the anode and the cathode. The fiber film includes a first layer and a second layer. The first layer includes a first fiber having a first diameter. The first layer is provided between the dielectric layer and the second layer. The second layer includes a second fiber having a second diameter smaller than the first diameter.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

FIG. 1 is a perspective view illustrating an aluminum electrolytic capacitor according to an embodiment.

Figure 2:
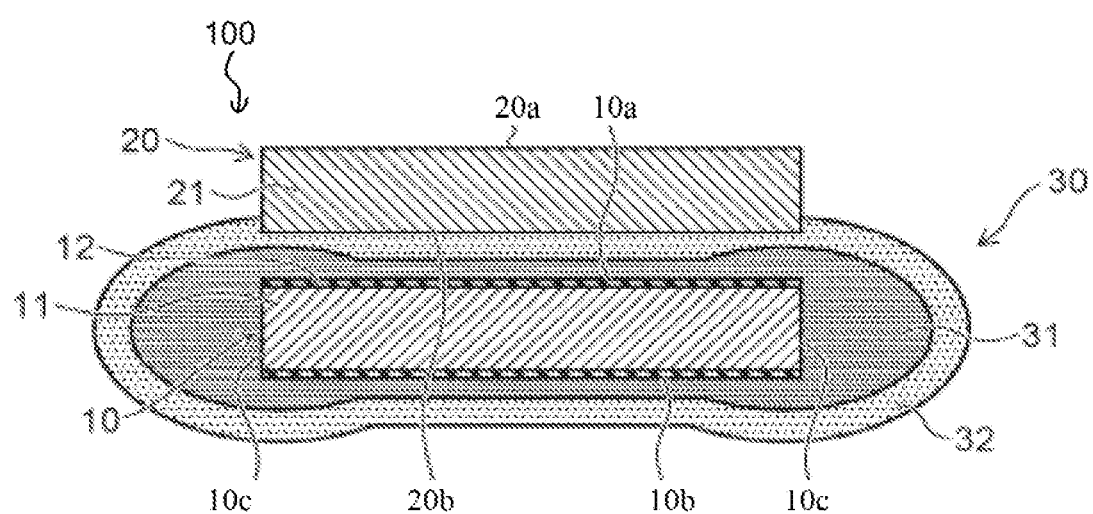
FIG. 2 is a cross sectional view illustrating a portion of the aluminum electrolytic capacitor according to the embodiment.

FIG. 2 is a cross sectional view illustrating a portion of the aluminum electrolytic capacitor according to the embodiment.

Figure 3A:
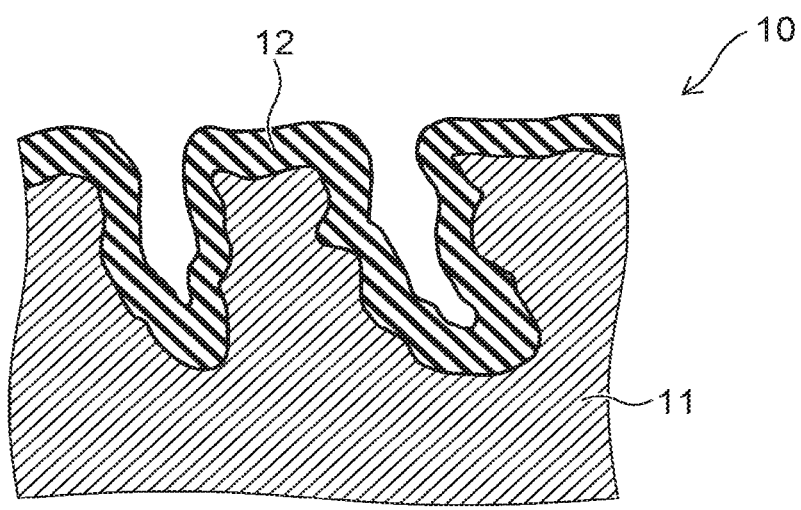
FIG. 3A and FIG. 3B are cross sectional views schematically illustrating surfaces of an anode and a cathode of the aluminum electrolytic capacitor according to the embodiment.
Figure 3B:
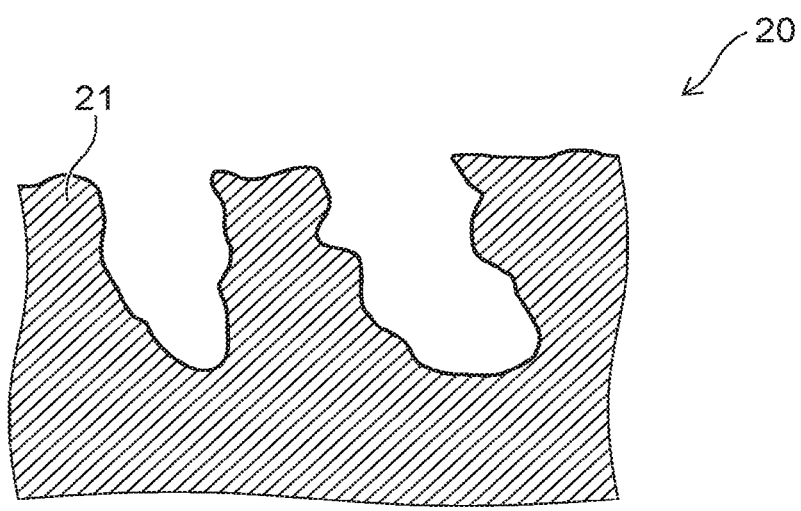

FIG. 3A and FIG. 3B are cross sectional views schematically illustrating surfaces of an anode and a cathode of the aluminum electrolytic capacitor according to the embodiment.

Figure 4A:
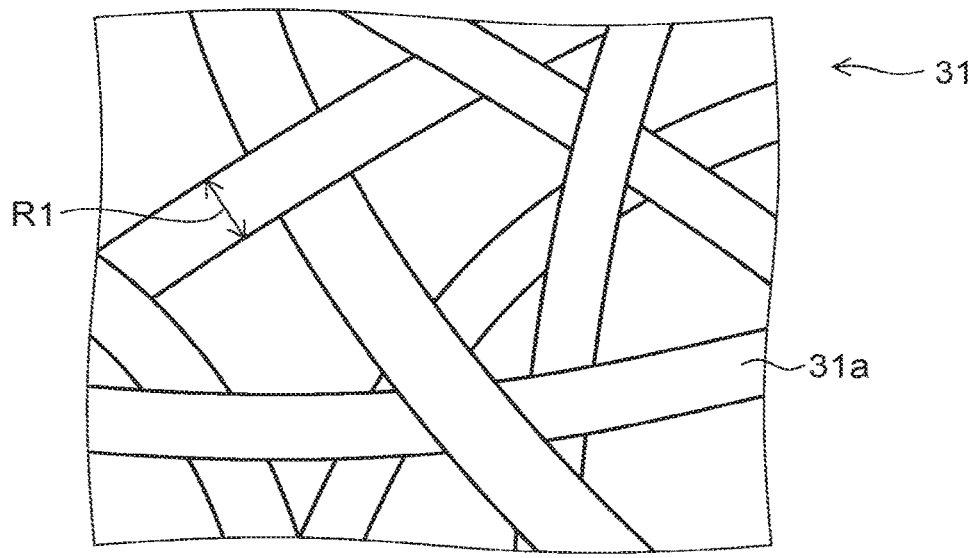
FIG. 4A and FIG. 4B are schematic views illustrating a first layer and a second layer of a fiber film of the aluminum electrolytic capacitor according to the embodiment.
Figure 4B:
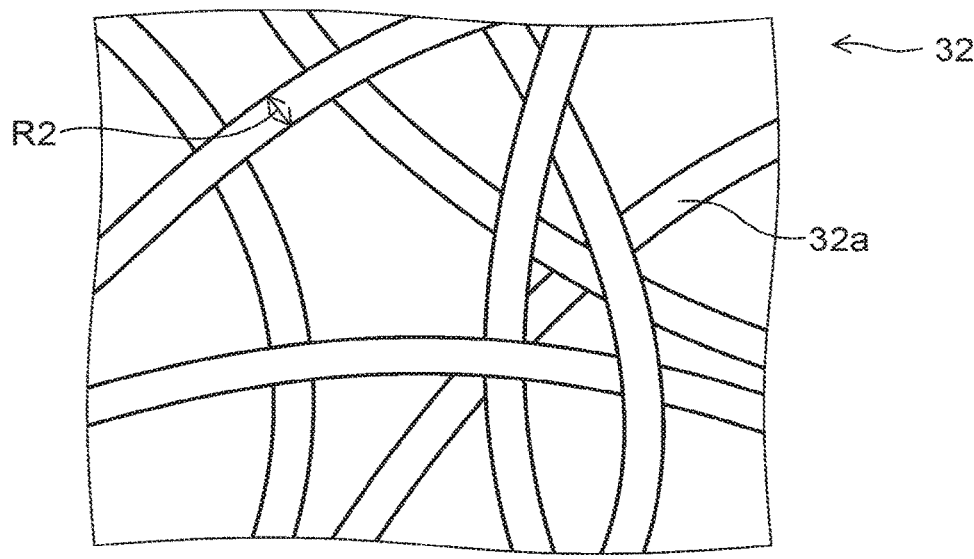

FIG. 4A and FIG. 4B are schematic views illustrating a first layer and a second layer of a fiber film of the aluminum electrolytic capacitor according to the embodiment.

As shown in FIG. 1 and FIG. 2, the aluminum electrolytic capacitor 100 according to the embodiment includes an anode 10, a cathode 20, and a fiber film 30. The aluminum electrolytic capacitor 100 has a cylindrical structure in which the anode 10, the cathode 20, and the fiber film 30 are wound in multiple layers. The aluminum electrolytic capacitor 100 includes a lead terminal 50 extending in a direction perpendicular to the winding direction. The aluminum electrolytic capacitor 100 is electrically connected, for example, to a circuit on a substrate of the electric instrument via the lead terminal 50, and functions as a capacitor in the electric instrument.

As shown in FIG. 2, the anode 10 includes a first surface 10a and a second surface 10b. The cathode 20 includes a third surface 20a and a fourth surface 20b. The first surface 10a is a surface facing the cathode 20. The fourth surface 20b is a surface facing the anode 10. That is, the first surface 10a of the anode 10 and the fourth surface 20b of the cathode 20 are surfaces facing each other. The second surface 10b is a surface opposite to the first surface 10a. The third surface 20a is a surface opposite to the fourth surface 20b.

The anode 10 includes a first metal layer 11, and a dielectric layer 12 formed on the surface of the first metal layer 11. The first metal layer 11 includes aluminum. The first metal layer 11 is made of, for example, an aluminum metal foil. The dielectric layer 12 is made of, for example, an aluminum oxide film. In this example, the dielectric layer 12 is formed on the first surface 10a and the second surface 10b of the anode 10. On the other hand, the dielectric layer 12 is not formed on the side surface 10c between the first surface 10a and the second surface 10b. In the embodiment, the dielectric layer 12 may be formed on the side surface 10c of the anode 10. The thickness of anode 10 (the distance between first surface 10a and second surface 10b) is, for example, not less than 10 µm and not more than 200 µm, and more preferably not less than 50 µm and not more than 150 µm.

The cathode 20 includes a second metal layer 21. The second metal layer 21 includes aluminum. The second metal layer 21 is made of, for example, an aluminum metal foil. The thickness of the cathode 20 (the distance between the third surface 20a and the fourth surface 20b) is, for example, not less than 10 μm and not more than 200 μm, and more preferably less than the thickness of the anode 10 and not less than 10 μm and not more than 100 μm.

As illustrated in FIG. 3A and FIG. 3B, the first metal layer 11 of the anode 10 and the second metal layer 21 of the cathode 20 each have fine concavity and convexity on the surface. The height of the concavity and convexity is, for example, about 1 μm. As illustrated in FIG. 3A, the dielectric layer 12 is formed along the concavity and convexity of the first metal layer 11. By having such irregularities, the surface areas of the anode 10 and the cathode 20 are increased, and the capacity of the aluminum electrolytic capacitor 100 can be increased.

The fiber film 30 is a film formed by depositing fibers including a polymer compound. The fiber film 30 functions as a separator (electrolytic paper). As described later, the fiber film 30 is impregnated (permeated) with the electrolytic solution. The thickness of the fiber film 30 is, for example, not less than 10 μm and not more than 200 μm. By setting the fiber film 30 to such a thickness, the number of windings per unit volume of the aluminum electrolytic capacitor 100 can be increased, and the capacity of the aluminum electrolytic capacitor 100 can be increased. In addition, by setting the fiber film 30 to such a thickness, short-circuit can be suppressed even when burrs or the like occur on a part of the anode 10 or the cathode 20.

As illustrated in FIG. 2, the fiber film 30 is provided at least between the anode 10 and the cathode 20. In this example, the fiber film 30 is provided so as to surround the anode 10. That is, the fiber film 30 is provided not only on the first surface 10a side of the anode 10 but also on the second surface 10b side of the anode 10 and the side surface 10c side of the anode 10.

The fiber film 30 includes a first layer 31 and a second layer 32. The first layer 31 is provided at least between the dielectric layer 12 of the anode 10 and the second layer 32. That is, between the anode 10 and the cathode 20, the first layer 31 is provided on the side of the anode 10 (dielectric layer 12), and the second layer 32 is provided on the side of the cathode 20. In this example, the first layer 31 is provided so as to surround the anode 10, and the second layer 32 is provided so as to surround the first layer 31.

As illustrated in FIG. 4A, the first layer 31 includes a first fiber 31a. The first fiber 31a includes a polymer compound. The first fiber 31a includes, for example, a polymer compound and inorganic particles. The inorganic particles are, for example, insulating inorganic compound particles. The inorganic particles are, for example, silica or alumina. The particle size of the inorganic particles is, for example, less than 1 μm. The inorganic particles are added as needed and can be omitted. The first fiber 31a has a first diameter R1. The first diameter R1 is, for example, an average diameter of the first fibers 31a. The first diameter R1 is, for example, not less than 3 μm and not more than 5 μm.

As illustrated in FIG. 4B, the second layer 32 includes a second fiber 32a. The second fiber 32a includes a polymer compound. The second fiber 32a has a second diameter R2. The second diameter R2 is, for example, an average diameter of the second fibers 32a. The second diameter R2 is, for example, not less than 1 μm and less than 3 μm.

As described above, the second diameter R2 is smaller than the first diameter R1. That is, the first layer 31 is a fiber layer formed of the first fibers 31a having a larger fiber diameter than the second fibers 32a. The second layer 32 is a fiber layer formed of the second fibers 32a having a smaller fiber diameter than the first fibers 31a. Due to this difference in fiber diameter, the density of the first layer 31 becomes higher than the density of the second layer 32. In other words, the first layer 31 has a dense structure with fewer voids than the second layer.

The porosity of the fiber film 30 is, for example, not less than 30% and not more than 80%. The porosity is a ratio of voids (portions without fibers) in the fiber film 30. The porosity can be expressed as 100×(VD−M)/VD (%) by the volume V of the fiber film 30, the weight M of the fiber film 30, and the density D of the fiber.

The aluminum electrolytic capacitor 100 is formed by winding in multiple layers the structure including the anode 10, the cathode 20, and the fiber film 30 illustrated in FIG. 2. In other words, in a state of winding in multiple layers, the fiber film 30 on the second surface 10b side of the anode 10 functions as a separator between the anode 10 and the cathode 20 on the second surface 10b side (inside).

Hereinafter, an apparatus used in the method for manufacturing an aluminum electrolytic capacitor according to the embodiment will be described.

Figure 5:
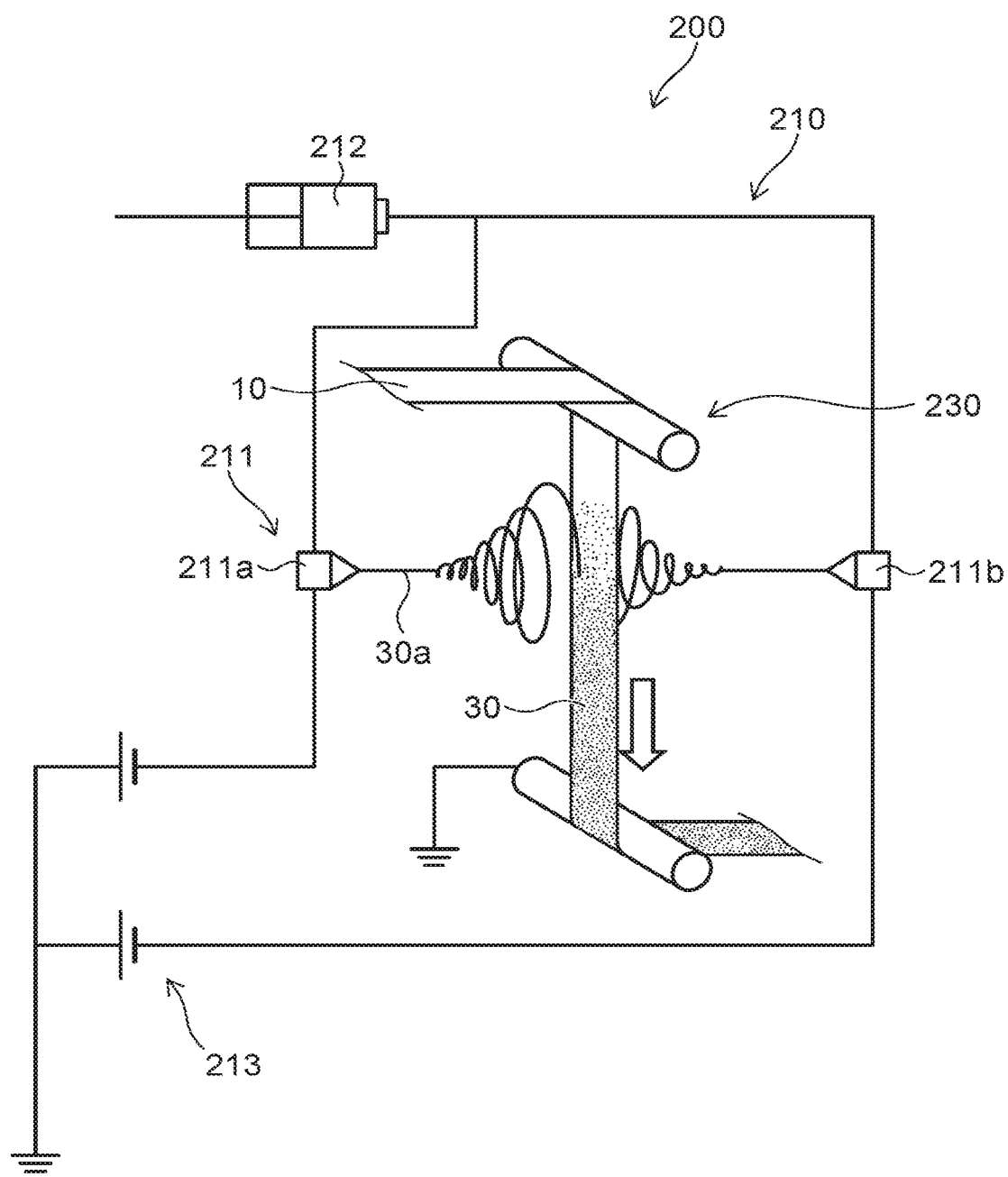
FIG. 5 is a schematic view illustrating a portion of a manufacturing apparatus used for the method for manufacturing the aluminum electrolytic capacitor according to the embodiment.
Figure 6:
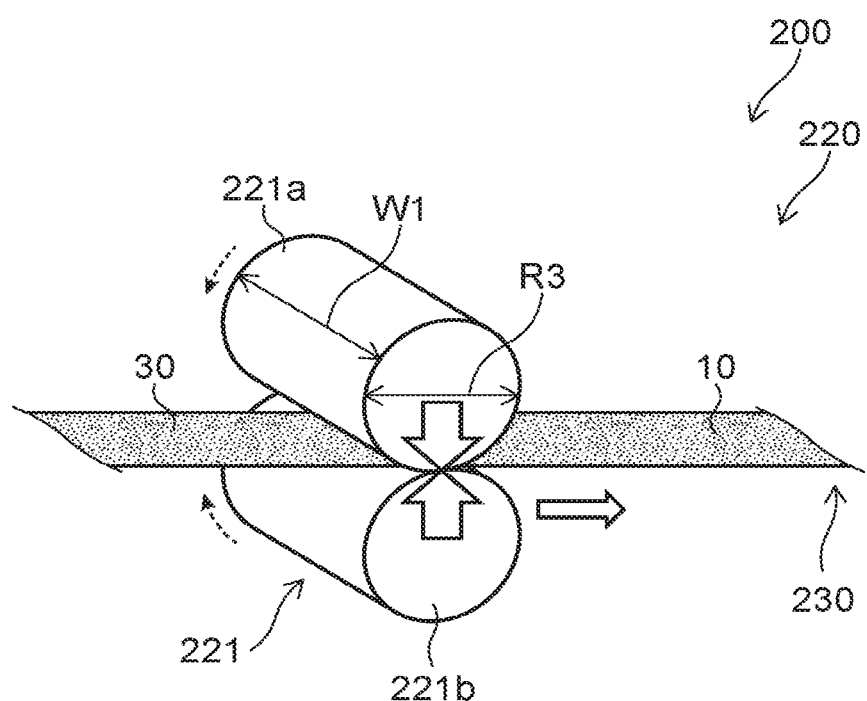
FIG. 6 is a schematic view illustrating a portion of a manufacturing apparatus used for the method for manufacturing the aluminum electrolytic capacitor according to the embodiment.

FIG. 5 and FIG. 6 are schematic views illustrating a portion of a manufacturing apparatus used for the method for manufacturing the aluminum electrolytic capacitor according to the embodiment.

FIG. 5 illustrates an electrospinning device 210 used for forming the fiber film 30 (forming process described later) of a manufacturing apparatus 200.

FIG. 6 illustrates a pressurizing device 220 used for fixing the fiber film 30 (fixing process described layer) of the manufacturing apparatus 200.

As illustrated in FIG. 5, the electrospinning device 210 forms the fiber film 30 by ejecting the fiber 30a by an electrospinning method to an electrode (in this example, the anode 10) transported by a transport section 230 of the manufacturing apparatus 200. The electrospinning device 210 includes a nozzle 211 that ejects the fiber 30a to the anode 10, a pump 212 that supplies a polymer compound solution that is a material of the fiber 30a to the nozzle 211, and a power supply 213 that applies a voltage to the nozzle 211.

The transport section 230 transports the anode 10 in a direction of the arrow by a roll-to-roll transport mechanism including an unwinding section (not shown) for unwinding the anode 10 and a winding section (not shown) for winding the anode 10. More specifically, the transport section 230 transports the anode 10 by unwinding the anode 10 before forming the fiber film 30 from a roll and winding the anode 10 after forming the fiber film 30 into a roll.

The nozzle 211 ejects the fiber 30a to the anode 10 transported by the transport section 230 to form the fiber film 30. The nozzle 211 is connected to the pump 212 and the power supply 213, and applies a voltage from the power supply 213 to the polymer compound solution supplied from the pump 212 to eject the fiber 30a.

In this example, the electrospinning device 210 includes a pair of nozzles 211a and 211b provided at positions facing each other across the anode 10. Thus, the fibers 30a can be ejected from both sides of the anode 10, and the fiber film 30 can be formed so as to surround the anode 10. In this example, the pair of nozzle 211a and the nozzle 211b is provided so as to eject the fibers 30a toward the first surface 10a and the second surface 10b of the anode 10. The pair of nozzle 211a and the nozzle 211b may be provided so as to eject the fiber 30a toward the side surface 10c of the anode 10.

For example, the fiber diameter of the fiber 30a ejected from the nozzle 211 can be adjusted by adjusting a raw material, a concentration and a liquid flow rate of the polymer compound solution supplied from the pump 212, a voltage difference between the nozzle 211 and the anode 10 (magnitude of the voltage applied from the power supply 213 to the nozzle 211), a distance from the nozzle 211 to the anode 10, and a diameter of the nozzle 211 or the like. Thereby, the first fibers 31a and the second fibers 32a having different fiber diameters can be ejected from the nozzle 211.

As described above, when the first layer 31 is formed on the anode 10 and the second layer 32 is further formed on the first layer 31, for example, another electrospinning device 210 for forming the second layer 32 is provided on the downstream side (winding section side) of the electrospinning device 210 for forming the first layer 31.

On the downstream side of the electrospinning device 210, the pressurizing device 220 for fixing the fiber film 30 formed by the electrospinning device 210 to an electrode (in this example, the anode 10) is provided. Thereby, formation of the fiber film 30 on the anode 10 and fixing of the fiber film 30 on the anode 10 can be performed continuously.

As illustrated in FIG. 6, the pressurizing device 220 includes a roller 221 that pressurizes the anode 10 on which the fiber film 30 is formed. The roller 221 rotates in a direction of the dashed arrow in a state of sandwiching the anode 10 transported by the transport section 230 on which the fiber film 30 is formed. Thus, the anode on which the fiber film 30 is formed is pressurized in the direction perpendicular to the first surface 10a and the second surface 10b. In this example, the pressurizing device 220 includes a pair of rollers 221a and 221b provided on the first surface 10a side and the second surface side 10b of the anode 10. The roller 221a is provided rotatably, for example, at a fixed position. The movable roller 221b is pressurized toward the roller 221a. Thus, the anode 10 on which the fiber film 30 is formed between the roller 221a and the roller 221b is pressurized in two directions on the first surface 10a side and the second surface 10b side.

The diameter R3 of the roller 221 is 250 mm or less. The lower limit of the diameter R3 of the roller 221 is not particularly limited, but is, for example, about 40 mm. The diameter of the roller 221a and the diameter of the roller 221b are the same.

The roller 221 pressurizes the anode 10 on which the fiber film 30 is formed with a press pressure of not less than 15 N/mm and less than 60 N/mm. The press pressure is represented by (load)/(width W1 of roller 221). The width of the roller 221a and the width of the roller 221b are the same. The load can be controlled based on, for example, measurement results of a load cell attached to an arm that moves the roller 221b.

In this example, the case where the fiber film 30 is formed on the anode 10 has been described. The fiber film 30 may be formed on the cathode 20 as described later. In this case, the electrode transported by the transport section 230 is changed to the cathode 20. At this time, as described later, in a case where the second layer 32 is formed on the cathode 20 and the first layer 31 is further formed on the second layer 32, for example, another electrolytic spinning device 210 for forming the first layer 31 is provided on the downstream side of the electrospinning apparatus 210 for forming the second layer 32.

Hereinafter, a method for manufacturing the aluminum electrolytic capacitor according to the embodiment will be described.

Figure 7:
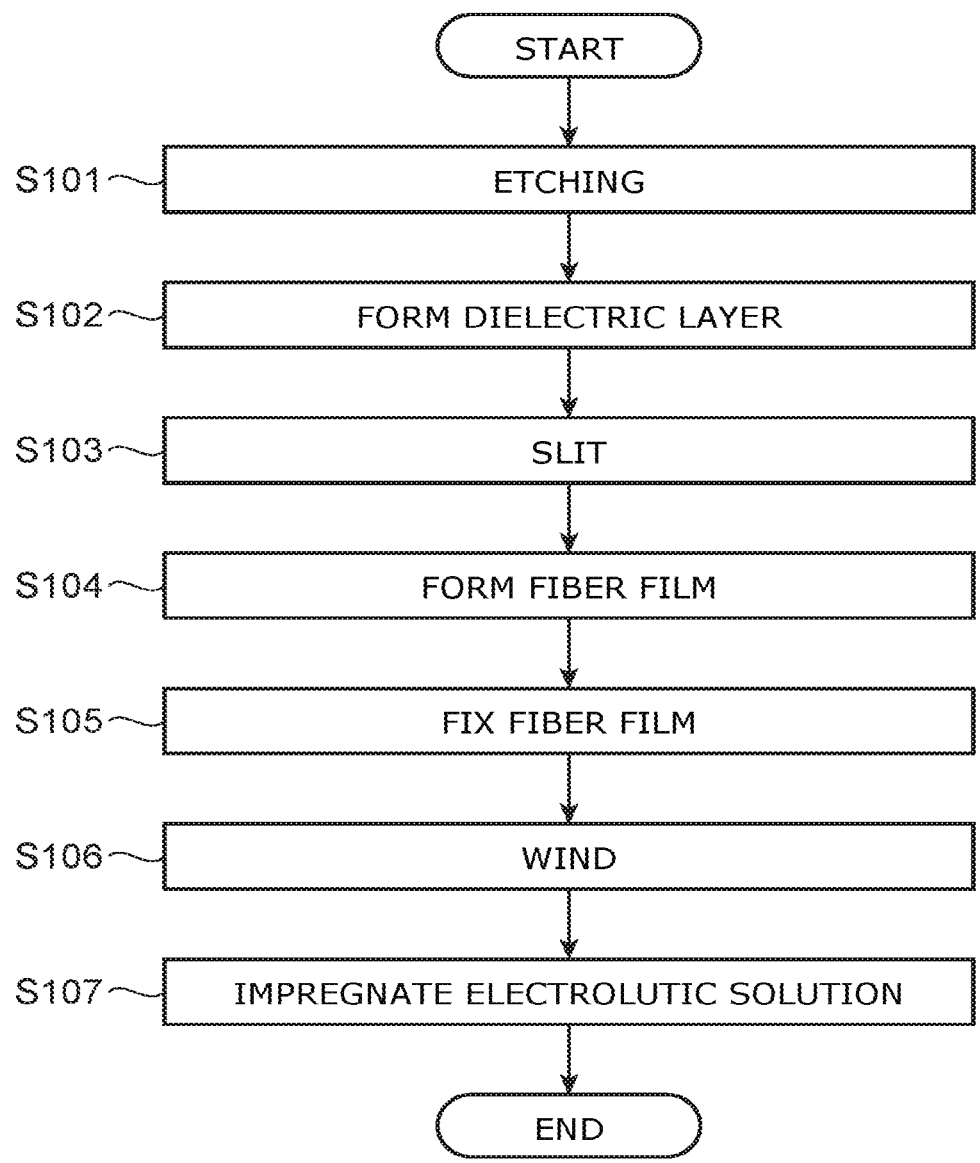
FIG. 7 is a flow chart illustrating one example of the method for manufacturing the aluminum electrolytic capacitor according to the embodiment.

FIG. 7 is a flow chart illustrating one example of the method for manufacturing the aluminum electrolytic capacitor according to the embodiment.

As illustrated in FIG. 7, in the method for manufacturing the aluminum electrolytic capacitor according to the embodiment, first, a first metal foil (first metal layer 11) that is a material of the anode 10 and a second metal foil (second metal layer 21) that is a material of the cathode 20 are subjected to an etching process. Thus, concavity and convexity as illustrated in FIG. 3A and FIG. 3B are formed on the surfaces of the first metal foil and the second metal foil (step S101).

Next, an oxide film forming treatment (so-called chemical conversion treatment) is performed on the first metal foil to form a dielectric layer 12 as illustrated in FIG. 3A on the surface of the first metal foil (step S102).

Next, the first metal foil and the second metal foil are each cut (slit) to a desired width to fabricate a roll (web) of the anode 10 and the cathode 20 (step S103). In the method for manufacturing the aluminum electrolytic capacitor according to the embodiment, the roll (web) of the anode 10 and the cathode 20 that has been subjected to the processes of steps S101 to S103 in advance may be prepared.

Next, using the electrospinning device 210 illustrated in FIG. 5, the fiber film 30 is formed on one of the anode 10 and the cathode 20 (the anode 10 in this example) by an electrospinning method (step S104: forming process). In this example, in the forming process, after the first fibers 31a having the first diameter R1 are deposited on the anode 10 to form the first layer 31, the second fibers 32a having the second diameter R2 smaller than the first diameter R1 are deposited on the first layer 31 to form the second layer 32. More specifically, after the first layer 31 is formed so as to surround the anode 10 by ejecting the first fibers 31a from the nozzle 211 of the electrospinning device 210 for forming the first layer 31, the second layer 31 is formed so as to surround the first layer 31 by ejecting the second fibers 32a from the nozzle 211 of the other electrospinning device 210 for forming the second layer 32.

Next, the fiber film 30 is fixed to the anode 10 by pressurizing the anode 10 on which the fiber film 30 is formed using the pressurizing device 220 illustrated in FIG. 6 (step S105: fixing process). In the fixing process, the anode 10 on which the fiber film 30 is formed is pressurized using a roller 221 having a diameter of 250 mm or less with a press pressure of not less than 15 N/mm and less than 60 N/mm.

Next, the anode 10 and the cathode 20 to which the fiber film 30 has been fixed are overlapped and wound in multiple layers (step S106: winding process). Further, the electrolytic solution is impregnated (permeated) into the fiber film 30 between the anode 10 and the cathode 20 by immersing the anode 10, the cathode 20, and the fiber film 30 wound in multiple layers in the electrolytic solution (step S107 impregnation process). As described above, the aluminum electrolytic capacitor 100 can be manufactured.

In this example, the case where the first layer 31 and the second layer 32 are formed as the fiber film 30 on the anode 10 has been described. However, in the method for manufacturing the aluminum electrolytic capacitor according to the embodiment, formation of the first layer 31 or the second layer 32 may be omitted. In other words, the aluminum electrolytic capacitor manufactured by the method for manufacturing the aluminum electrolytic capacitor according to the embodiment may have a single-layer fiber film 30. Further, in the method for manufacturing the aluminum electrolytic capacitor according to the embodiment, the fiber film 30 may be formed on the cathode 20 as described later.

Hereinafter, the effects of the aluminum electrolytic capacitor 100 according to the embodiment and the method of manufacturing the aluminum electrolytic capacitor according to the embodiment will be described.

As means for increasing the capacity of the aluminum electrolytic capacitor, it is conceivable to make the separator thinner. However, when the separator is made thin, there is a problem that it is difficult to perform winding. As a means for solving this, it is conceivable to use a thin fiber film formed on the electrode by the electrospinning method as a separator.

When a separator is formed of a fiber film in this manner, properties such as breakdown voltage and permeability of an electrolytic solution vary depending on the density of the fiber film, and thus desired performance may not be obtained. For example, if the fiber film has a high-density structure, the breakdown voltage of the fiber film can be improved, but the permeability of the electrolytic solution into the fiber film may decrease, and the capacity may decrease. On the other hand, when the fiber film has a low-density structure, the permeability of the electrolytic solution into the fiber film can be improved, but the breakdown voltage of the fiber film is reduced, and a short circuit may occur.

Thus, in the embodiment, the fiber film 30 having the first layer 31 and the second layer 32 having different fiber diameters is provided between the anode 10 and the cathode 20. As described above, since the first layer 31 has a dense structure with fewer voids than the second layer 32, the breakdown voltage is higher than that of the second layer 32. On the other hand, the first layer 31 has a dense structure with fewer voids than the second layer 32, and therefore has lower permeability of the electrolytic solution than the second layer 32. In contrast, since the second layer 32 has a sparse structure having more voids than the first layer 31, the breakdown voltage is lower than that of the first layer 31. On the other hand, the second layer 32 has a sparse structure with many voids than the first layer 31, and therefore has higher permeability of the electrolytic solution than the first layer 31. In the embodiment, by providing the fiber film 30 having a two-layer structure including the first layer 31 having excellent breakdown voltage and the second layer 32 having excellent permeability of the electrolytic solution, the breakdown voltage of the fiber film 30 and the permeability of the electrolytic solution to the fiber film 30 can be compatible.

In the embodiment, the first layer 31 is provided between the dielectric layer 12 of the anode 10 and the second layer 32. In other words, the first layer 31 having a large fiber diameter is provided on the side of the anode 10 including the dielectric layer 12, and the second layer 32 having a small fiber diameter is provided on the side of the cathode 20. This makes it possible to improve the breakdown voltage of the fiber film 30 on the side of the anode 10 including the dielectric layer 12 and to improve the permeability of the electrolytic solution into the fiber film 30 on the side of the cathode 20. Therefore, compared with the case where the second layer 32 is provided on the side of the anode 10 including the dielectric layer 12 and the first layer 31 is provided on the side of the cathode 20, the breakdown voltage of the fiber film 30 and the permeability of the electrolytic solution into the fiber film 30 can be surely compatible. Thereby, while suppressing short circuit by improving the breakdown voltage of the fiber film 30, the capacity of the aluminum electrolytic capacitor 100 can be increased by improving the permeability of the electrolytic solution into the fiber film 30.

In the embodiment, it is preferable to provide the fiber film 30 (the first layer 31 and the second layer 32) so as to surround the anode 10. By providing the fiber film 30 not only on the first surface 10a side of the anode 10 but also on the second surface 10b side of the anode 10, when the anode 10 and the cathode 20 are wound in multiple layers, there is no need to provide another separator between the anode 10 and the cathode 20 positioned on the second surface 10b side of the anode 10. Further, the fiber film 30 covers not only between the anode 10 and the cathode 20 but also the side surface 10c side of the anode 10, so that the side surface 10c side of the anode 10 where the dielectric layer 12 is not formed can be also insulated by the fiber film 30. Thereby, short circuit can be suppressed.

In the embodiment, it is preferable to add inorganic particles having a particle size of less than 1 μm to the first fibers 31a. Thereby, the breakdown voltage of the first layer 31 can be improved, and the first layer 31 can be thinned. By making the first layer 31 thinner, the fiber film 30 can be made thinner, so that the number of windings per unit volume of the aluminum electrolytic capacitor 100 can be increased as compared with the case where the fiber film 30 is thick. The capacity of the electrolytic capacitor 100 can be increased.

In the embodiment, it is preferable that the porosity of the fiber film 30 be not less than 30% and not more than 80%. Thereby, both the breakdown voltage of the fiber film 30 and the permeability of the electrolytic solution into the fiber film 30 are more reliably achieved. Accordingly, the separator can be made thinner and the capacity of the aluminum electrolytic capacitor 100 can be increased while suppressing the short circuit more reliably.

Further, since the fiber film formed by the electrospinning method is easily peeled off from the electrode, it is necessary to fix the fiber film to the electrode by applying pressure after forming the fiber film. At this time, depending on the condition of pressurizing, the concavity and convexity on the surface of the electrode may be crushed, and the capacity of the aluminum electrolytic capacitor may be reduced.

Therefore, in the embodiment, in the fixing process, the roller 221 having a diameter of 250 mm or less is used, and the press pressure is set to not less than 15 N/mm and less than 60 N/mm. By using the roller 221 having a diameter of 250 mm or less, the contact area between the roller 221 and the fiber film 30 is reduced. Thus, it is possible to suppress crushing the concavity and convexity of the surfaces of the anode 10 and the cathode 20 due to being pressurized. Further, by setting the press pressure to not less than 15 N/mm and less than 60 N/mm, it is possible to reliably fix the fiber film 30 to the anode 10 and to suppress crushing the concavity and convexity of the surfaces of the anode 10 and the cathode 20. Therefore, the fiber film 30 can be reliably fixed to the anode 10, and the capacity of the aluminum electrolytic capacitor 100 can be increased.

Figure 8:
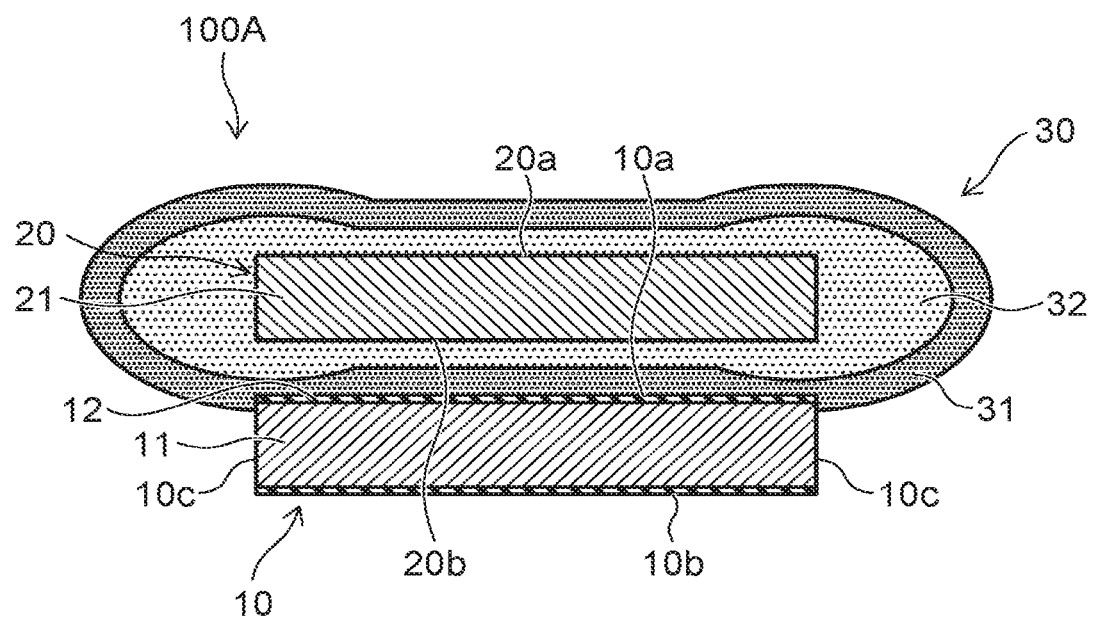
FIG. 8 is a cross sectional view illustrating a portion of an aluminum electrolytic capacitor according to a modification of the embodiment.

FIG. 8 is a cross sectional view illustrating a portion of an aluminum electrolytic capacitor according to a modification of the embodiment.

As illustrated in FIG. 8, in this example, the fiber film 30 is provided so as to surround the cathode 20. More specifically, the second layer 32 is provided so as to surround the cathode 20, and the first layer 31 is provided so as to surround the second layer 32. That is, the first layer 31 is provided between the anode 10 and the cathode 20 and between the dielectric layer 12 and the second layer 32.

For example, other than that in the forming step, the second fibers 32a are deposited on the cathode 20 to form the second layer 32, and then the first fibers 31a are deposited on the second layer 32 to form the first layer 31, and in the fixing process, the cathode 20 on which the fiber film 30 (the second layer 32 and the first layer 31) is formed is pressurized, an aluminum electrolytic capacitor 100A according to the modification can be manufactured in the same manner as the above-described method for manufacturing the aluminum electrolytic capacitor 100.

In this case, it is preferable that, in the forming process, after the second layer 32 is formed so as to surround the cathode 20, the first layer 31 is formed so as to surround the second layer 32. Thereby, the fiber film 30 (the second layer 32 and the first layer 31) can be easily formed so as to surround the cathode 20.

Also in this modification, the first layer 31 having a large fiber diameter is provided on the side of the anode 10 including the dielectric layer 12, and the second layer 32 having a small fiber diameter is provided on the side of the cathode 20, thereby as compared with the case where the second layer 32 is provided on the side of the anode 10 including the dielectric layer 12 and the first layer 31 is provided on the side of the cathode 20, the breakdown voltage of the fiber film 30 and the permeability of the electrolytic solution into the fiber film 30 are reliably compatible. This makes it possible to increase the capacity of the aluminum electrolytic capacitor 100 by reducing the thickness of the separator while suppressing short circuits.

As described above, according to the embodiment, an aluminum electrolytic capacitor, an electric instrument, and a method for manufacturing an aluminum electrolytic capacitor that can increase the capacity while suppressing short circuits are provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:

1. A method for manufacturing an aluminum electrolytic capacitor, the aluminum electrolytic capacitor including an anode, a cathode, and a fiber film, the anode including a first metal layer and a dielectric layer, the first metal layer including aluminum, the dielectric layer being formed on the first metal layer, the cathode including a second metal layer, the second metal layer including aluminum, the fiber film being provided between the anode and the cathode, the method comprising:
    forming the fiber film on one the anode and the cathode by an electrospinning method, the fiber film being electrospun directly attached on the one of the anode and the cathode; and
    fixing the fiber film to the one of the anode and the cathode by pressurizing the fiber film attached to the one of the anode and the cathode, the fixing being performed after the forming,
    in the fixing, the fiber film attached to the one of the anode and the cathode being pressurized with a press pressure not less than 15 N/mm and less than 60 N/mm by using roller having a diameter of 250 mm or less.

2. The method for manufacturing the aluminum electrolytic capacitor according to claim 1, further comprising:
    winding multiple layers by overlapping the one of the anode and the cathode including the fiber film fixed and other one of the anode and the cathode, the winding being performed after the fixing; and
    impregnating an electrolytic solution into the fiber film, the impregnating being performed after the winding.

3. The method for manufacturing the aluminum electrolytic capacitor according to claim 1, wherein
    in the forming, after forming a first layer by depositing a first fiber on the anode, a second layer is formed by depositing a second fiber on the first layer, the first fiber having a first diameter, the second fiber having a second diameter smaller than the first diameter.

4. The method for manufacturing the aluminum electrolytic capacitor according to claim 3, wherein
    in the forming, after the first layer is formed to surround the anode, the second layer is formed to surround the first layer.

5. The method for manufacturing the aluminum electrolytic capacitor according to claim 1, wherein
    in the forming, after a second layer is formed by depositing a second fiber on the cathode, a first layer is formed by depositing a first fiber on the second layer, the second fiber having a second diameter, the first fiber having a first diameter larger than the second diameter.

6. The method for manufacturing the aluminum electrolytic capacitor according to claim 5, wherein
    in the forming, after the second layer is formed to surround the cathode, the first layer is formed to surround the second layer.

* * * * *